(12) United States Patent
Goodman et al.

(10) Patent No.: US 12,407,528 B2
(45) Date of Patent: Sep. 2, 2025

(54) CERTIFICATE BASED SECURITY FOR DECLARATIVE OPERATIONS

(71) Applicant: DELL PRODUCTS L.P., Round Rock, TX (US)

(72) Inventors: Bradley Keith Goodman, Nashua, NH (US); Joseph Brent Caisse, Burlington, MA (US)

(73) Assignee: Dell Products L.P., Round Rock, TX (US)

( * ) Notice: Subject to any disclaimer, the term of this patent is extended or adjusted under 35 U.S.C. 154(b) by 263 days.

(21) Appl. No.: 18/309,522

(22) Filed: Apr. 28, 2023

(65) Prior Publication Data
US 2024/0235855 A1    Jul. 11, 2024

Related U.S. Application Data

(63) Continuation-in-part of application No. 18/151,769, filed on Jan. 9, 2023.

(51) Int. Cl.
*H04L 9/32* (2006.01)
*H04L 9/40* (2022.01)

(52) U.S. Cl.
CPC ........ *H04L 9/3268* (2013.01); *H04L 63/0823* (2013.01); *H04L 63/20* (2013.01)

(58) Field of Classification Search
CPC .... H04L 9/3268; H04L 63/0823; H04L 63/20
See application file for complete search history.

(56) References Cited

U.S. PATENT DOCUMENTS

| | | | |
|---|---|---|---|
| 2019/0327315 A1 | 10/2019 | Grooters et al. | |
| 2020/0074067 A1* | 3/2020 | Varghese | G06F 21/645 |
| 2021/0051029 A1 | 2/2021 | Pham et al. | |
| 2023/0319018 A1* | 10/2023 | Gourlay | H04L 63/0823 |
| | | | 713/168 |

\* cited by examiner

*Primary Examiner* — Sangseok Park
(74) *Attorney, Agent, or Firm* — Larson Newman, LLP

(57) ABSTRACT

An endpoint node of a multiple node environment includes a storage and a processor. The storage stores a public key for an owner of the endpoint node. The processor receives a declarative request. The declarative request includes a signed certificate and a job to be performed in the endpoint node. In response to reception of the declarative request, the processor determines that the signed certificate is valid, and begins execution of the job associated with the declarative request. In response to a trigger event, the processor rechecks the signed certificate, and determines whether the signed certificate has been revoked. In response to the signed certificate being revoked, the processor performs an action indicated in a policy in the storage.

14 Claims, 5 Drawing Sheets

CERTIFICATE BASED SECURITY FOR DECLARATIVE OPERATIONS

CROSS-REFERENCE TO RELATED APPLICATION

This application is a Continuation-in-Part of U.S. patent application Ser. No. 18/151,769 entitled "CERTIFICATE BASED SECURITY FOR DECLARATIVE OPERATIONS," filed on Jan. 9, 2023, the disclosure of which is hereby expressly incorporated by reference in its entirety.

Related subject matter is contained in co-pending U.S. patent application Ser. No. 18/309,473 entitled "CERTIFICATE BASED SECURITY FOR DECLARATIVE OPERATIONS," filed Apr. 28, 2023, the disclosure of which is hereby incorporated by reference.

Related subject matter is contained in co-pending U.S. patent application Ser. No. 18/309,551 entitled "CERTIFICATE BASED SECURITY FOR DECLARATIVE OPERATIONS," filed Apr. 28, 2023, the disclosure of which is hereby incorporated by reference.

FIELD OF THE DISCLOSURE

The present disclosure generally relates to information handling systems, and more particularly relates to certificate based security for declarative operations.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An endpoint node of a multiple node environment may store a public key for an owner of the endpoint node. A processor may receive a declarative request. The declarative request may include a signed certificate and a job to be performed in the endpoint node. In response to reception of the declarative request, the processor may determine that the signed certificate is valid, and begin execution of the job associated with the declarative request. In response to a trigger event, the processor may re-check the signed certificate, and determine whether the signed certificate has been revoked. In response to the signed certificate being revoked, the processor may perform an action indicated in a policy in the storage.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
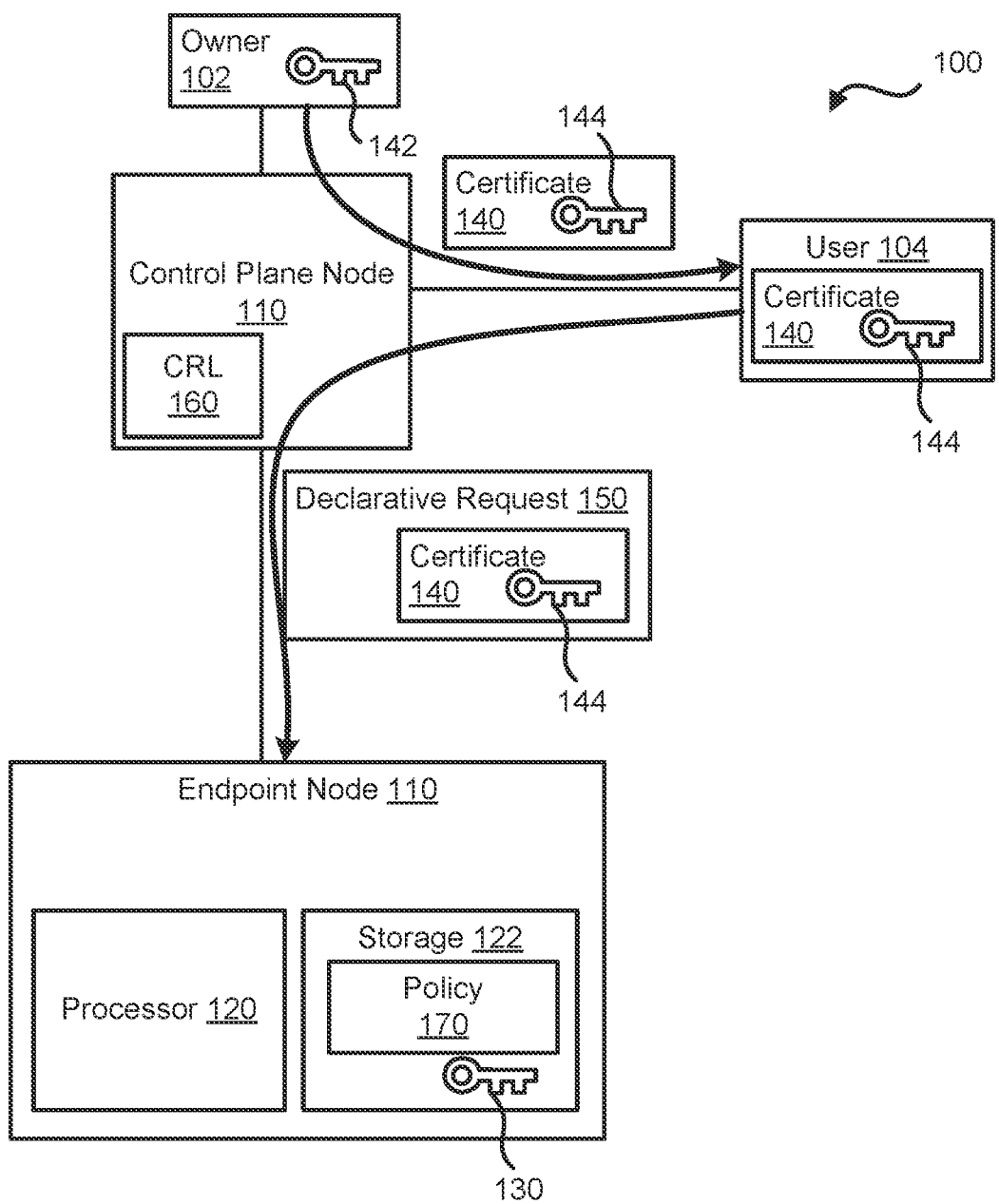
FIG. 1 is a block diagram of a multiple node environment according to at least one embodiment of the present disclosure.

FIG. 1 illustrates a multiple node environment 100 according to at least one embodiment of the present disclosure. Multiple node environment 100 includes an owner node 102 and a user node 104 that may access endpoint nodes 108 through a control plane 110. Endpoint node 108 may include a processor 120 and a storage 122. Control plane 110 may include any suitable type of control-plane, such as a global control plane node, regional control plane node, and local control plane node. In an example, global CP nodes, regional CP nodes, local CP nodes, and endpoint node 108 may be any suitable information handling system, such as substantially similar to information handling system 400 of FIG. 4, wherein each node may include a storage and a processor as described below with respect to FIG. 4. Multiple node environment 100 may include any suitable number of additional components or information handling systems without varying from the scope of this disclosure.

In an example, endpoint node 108 may store an owner public key 130 in storage 122. Owner public key 130 may be utilized by endpoint node 108 to authenticate any received messages or requests. In certain examples, owner public key 130 may be hard coded within endpoint node 108 or any other suitable node outside of the control plane of multiple node environment 100. Owner public key 130 may be associated with owner node 102 of endpoint node 108, such as a company, a user, or the like. In an example, security of owner public key 130 may be increased based on the owner public key being stored within a trusted platform module (TPM) of endpoint node 108.

In certain examples, owner 102 may perform one or more suitable operations to grant one or more rights or operations to user 104. For example, owner 102 may provide a signed certificate 140 to user 104 via control plane node 112. In an example, certificate 140 may be signed by an owner private key 142 and may authorize user 104 to request that one or more services or operations be performed in endpoint 108. Certificate 140 may include a key signature 144 that was generated from owner private key 142. In certain examples, user 104 may provide a request 150 including, but not limited to, an imperative request and a declarative request. Request 150 may include certificate 140 and key signature 144, which in turn may enable endpoint node 108 to authorize or validate the certificate received from user 104.

In an example, an imperative request or command may involve a particular action to be performed. For example, an imperative request may be for a memory in an endpoint, such as endpoint 108, to be locked. In response to the imperative request, the endpoint may lock the designated memory. Subsequently, another request may be received to unlock the memory at which point the memory may be unlocked and the imperative request may no longer have any effect.

In an example, a declarative request or command may involve an action to be performed for an extended amount of time. For example, a declarative request may indicate that a memory should be locked. In response to the declarative request, the endpoint may lock the designated memory. Subsequently, another request may be received to unlock the memory at which point the memory may be unlocked. In an example, the declarative request may be different than an imperative request based on the declarative request still being implemented after the subsequent request was performed. For example, if the declarative request is for the memory to be locked and a subsequent request unlocks the memory, the declarative request may cause the memory to be locked again after the subsequent request is no longer being performed. In certain examples, a component, such as a memory, in an endpoint node may have a default state, a declarative request may cause the endpoint to place the component in a declarative state, and an invalidate request may end the declarative request or state so that the component is placed back in the default state.

In an example, declarative requests may live or be active over a long period of time. However, the certificates which predicate the security of these declarative requests may change during the period of time. In this situation, a command associated with a declarative request may be valid at the time of issuance but may later become invalid. In previous information handling systems or endpoint nodes, decisions or actions associated with the invalidation of an outstanding request for a declarative statement whose underlying security credentials have changed may not be straightforward. For example, the invalidation actions may require greater logic to balance security and avoid unintentionally desired behavior.

In certain examples, security of endpoint node, such as endpoint 108, may be based on execution of commands in an imperative request. In an example, security models may fundamentally be built on fundamentally deciding if a user is allowed or authorized to request that an operation be performed. This may be an imperative model which is assessed when the operation is requested or performed. However, declarative workloads may be long-lived, with persistent rules, such that these workloads are not imperative commands. In this situation, a simple imperative model does not work.

In an example, a declarative security model may be used for more a user causing an endpoint, such as endpoint 108, to perform an action. If after reception of a declarative or an imperative request, endpoint 108 may be unplugged then later re-plugged in. Based on endpoint 108 being plugged in, the endpoint may perform different operations based on whether the request is declarative or imperative. For example, if endpoint 108 had received an imperative request, the endpoint would wait for a new command or request before an operation is performed. However, if endpoint 108 had received a declarative request, that declarative request may be durable. Thus, endpoint 108 would continuously perform operations to maintain the desired state indicated in the declarative request.

In certain examples, multiple node system 100 may implement a certificate-based security. In an example, certificates may be a way for one trusted entity, such as owner 102, to convey trust to another user, such as user 104. For example, endpoint 108 may include owner public key 130 for owner 102 stored within storage 122 and as such the endpoint may be able to authenticate and trust commands or requests from the owner. In an example, owner 102 may sign certificate 140 using owner private key 142, and the certificate may grant or authorize user 104 request operations to be performed in endpoint 108. The trust of owner 102 may be referred to as 'root' trust, which is known in the art and will not be described further except as needed for discussion of this disclosure.

In an example, certificates may be generally long-lived and may be distributed over different components of multiple node system 100. In certain examples, long lived certificates may be difficult to control, which may cause security problems with multiple node system 100. These security problems may be solved or corrected by any suitable means including, but not limited to, specifying expiration rules for the certificates, and allowing explicit revocation of the certificates.

In certain examples, one or more suitable declarative managers including, but not limited to, systemd, and Linux 'init' and 'cron' utilities, may ensure that a service or operation of a declarative request is started each time the computer starts, to run it periodically, or the like. In an example, a basic declarative request may be like an imperative one, such that the request may be evaluated, and action is taken when the request is received. However, if certificate-based permissions were used to attest the validity and authorize an operation to be performed, the certificate management practices may change this validity over time. For example, the first-time endpoint 108 installs a service and is told it to execute the service, the certificate must have been valid. But upon a subsequent reboot, if the certificate has expired, then the service would not restart upon reboot. An information handling system, such as endpoint node 108, may be improved by controlling how certificates are utilized for declarative requests as will be described herein.

In an example, a certificate solution might include verifying a certificate for a declarative request only when the request is initially made. The declarative request may be for a service to be run every time an information handling system, such as endpoint node 108, is booted. Based on this solution, if the certificate later becomes invalid, the service may restart at a later boot of the information handling system because the certificate would not be verified again. In an example, the certificate solution of only verifying certificate 140 when declarative request 150 is received at endpoint node 108 might not always be appropriate. For example, there may be many reasons why certificate 140 may not work or not be valid later.

If the service initiated by declarative request 150 is an important service in endpoint node 108, this service should not suddenly stop working just because certificate 140, or an upstream dependency, has expired. In this situation, the service initiated by declarative request 150 maybe should continue to operate even if user 104 forgets to renew long-forgotten certificates, such as certificate 140. For example, essential services should not stop running fail to restart for simple expirations of certificates, such as certificate 140. In an example, owner 102 may explicitly revoke certificate 140. In this example, owner 104 may want to stop or end the service or services initiated by declarative request 150. In certain examples, certificate 140 may be revoked for any suitable number of reasons including, but not limited to, user 104 retiring and the user being fired. In the case of user 104 retiring, all certificates including certificate 140 may be retired, but owner 102 may want any long-standing services started by declarative request 150 to continue to operation. In the situation where user 104 is fired, all certificates including certificate 140 may be retired, and owner 102 may want all services started by declarative request 150 to end or be terminated.

In an example, processor 120 of endpoint node 108 may perform one or more suitable operations to determine whether declarative request 150 is authorized. For example, processor 120 may utilize public key 130 to verify key signature 144 in certificate 140 of declarative request 150. In response to certificate 140 being verified, processor 120 may allow the operation or service identified in declarative request 150 to run or be executed. After the operation has begun, processor 120 may continually monitor the operation or service to ensure that the specified conditions are maintained.

In certain examples, processor 120 may implement a declarative request solution to continually determine whether a service in declarative request 150 may be executed. For example, processor 120 may recheck certificate 140 at any suitable point including, but not limited to, before restarting the operation of declarative request 150, when any state change of the operation is made, when known actions to impact the certificate occur, and periodically. In an example, if endpoint node 108 is rebooted, processor 120 may recheck certificate 140 of declarative request 150 before restarting an operation or service in the declarative request. In this example, certificate 150 may be revoked by owner 102 after the initial authorization of declarative request 150. Thus, upon endpoint node 108 rebooted, processor 120 may recheck certificate 150 and determine that the certificate is revoked and as a result prevent the restart of the service in declarative request 150.

In an example, during the initial authorization of declarative request 150, processor 120 may determine that certificate 140 was only valid for a period of time. In certain examples, the period of time may be any suitable length of time including, but not limited to, a number of days, weeks, months, and year. Based on the detection of an expiration time for certificate 140, processor 120 may set a revocation timer that is substantially equal to the period of the certificate. In response to the end of the timer, processor 120 may invalidate declarative request 150 and stop the execution of the service. In an example, if processor 120 receives an update indication or updated certificate 140 with a new expiration period, the processor may cancel, reset, or restart the timer.

In certain examples, certificates, such as certificate 140, may be revoked via Certificate Revocation Lists (CRLs) 160, an Online Certificate Status Protocol (OSCP), or the like. In an example, CRLs 160 may be published and stored in any suitable location, such as control plane node 110, of multiple node system 100. Processor 120 may receive CRLs 160 via any suitable manner, such as control plane node 110 pushing the CRLs to endpoint node 108, processor pulling the CRLs, the processor reading data from the CRLs, or the like. In an example, processor 120 may recheck certificate 140 based on a new CRL 160. Endpoint node 108 may include one or more policies 170 to control how and when processor 120 rechecks certificate 140.

In an example, multiple node system 100 may include security policy 170, which may be provided to endpoint 108 and stored in storage 122 for use by processor 120. In certain examples, security policy 170 may specify a granular basis of how processor 120 should handle rechecking the authentication of certificate 140 in declarative request 150. Security policy 170 may be provided to endpoint node 108 via any suitable manner, such as being sent by control plane node 110. In an example, policy 170 may be specified as part of declarative request 150 of the work being done. Policy 170 may be indicated in any suitable manner including, but not limited to, a single field or value to specify what to do, and a set of individual flags defining what to do in various instances.

In certain examples, a flags or security policies may be any suitable policies including, but not limited to, a policy to validate certificate 140 only during initial ingestion of declarative request 150, a policy that only priority revocations may invalidate a declarative task, a policy that an expiration of the certificate will invalidate the task, and a policy that any invalidation, revocation or expiration will invalidate the task. In an example, if certificate 140 is validated during the ingestion only policy, the job or request may continue forever even if security of the certificate becomes invalidated.

In an example, multiple node system 100 may allow assessment policies to be specified or controlled by separate entities, via a different permissions, privileges, or enforcement schema. The assessment policies may be system or implementation dependent, and may include, but are not limited to, a hard-coded policy, a single centrally controller global policy, an administrator only permission, a permissions-based model, a per-system basis, and a per job basis. In an example, a single centrally controlled global policy may be a policy that is applied to all systems or endpoint nodes, such as endpoint node 108 under control of central plane 110. In certain examples, an administrator only permission, such as "root" user or the like, may mean only such an administratively privileged user could specify Security-Policy. A permissions-based model may enable only a user with specific permissions may set Security Policies.

In certain examples, certificate 140 for user 104 may be invalidated for any reason. Based on certificate 140 being invalidated, processor 120 may determine whether to stop the job or service associated with declarative request 150. In an example, processor 120 may perform or execute any suitable mechanism, such as auditing, eventing, or the like, to determine whether the job associated with declarative request 150 should be stop based on certificate 140 being invalidated.

When processor 120 is executing in an auditing mode, the processor may poll or interrogate control plane node 110 for changes to certificates, such as certificate 140, declarative requests, such as declarative request 150, or the like. In this example, processor 120 may detect declarative request 140 and may check or audit this request to determine whether it is still valid. In an example, determining whether declarative request 140 may include determining whether certificate 140 associated with the declarative request has expired or has been revoked. As described above, certificate 140 may be checked by pulling or reading receive CRL 160 to determine whether the certificate is in the CRL. If certificate 140 is in CRL 140, the certificate is expired or revoked. Otherwise, certificate 140 is still active and the job or service for declarative request 150 may continue. During the auditing mode, a user of endpoint node 108 may cause processor 120 to actively perform one or more operations to determine whether certificate 140 for declarative request 150 is valid.

While processor 120 is in the eventing mode, events or changes in certificate may be generated by any component with multiple node system 100 and reported to the processor of endpoint node 108. In certain examples, the reporting of events may be provided to endpoint node 108 via owner 102, control plane 110, or the like. In an example, control plane node 110 or processor 120 may periodically check CRLs 160 and determine whether certificate 140 has been invalidated, has expired, or the like. In certain examples, processor 120 may evaluate or retrieve data from CRL 160 at a particular interval. However, if endpoint node 108 is unplugged from multiple node system 100, processor 120 may not be able to access CRL 160. In this situation, processor 130 may no longer be able to determine whether certificate 140 has been revoked. Processor 120 may have a maximum check interval with respect to CRL 160. If processor 120 cannot access CRL 160 before the expiration of the maximum check interval, the processor may generate an event based on the expiration of the maximum check interval.

In the eventing mode, if certificate 140 is in CRL 160, an invalidation event or an expiration event may be generated for the certificate and declarative request 150. Based on the invalidation or expiration event, processor 120 may provide a notification to any user, such as a user of endpoint node 108, user 104, owner 102, or the like, of multiple node system 100. In certain examples, the events may be generated, and the audits may be performed in any suitable manner know to one skilled in the art.

As discussed above, revocation of certificate 140 may happen for many reasons, and the handling of the revocation may be different in different scenarios but may be the same in of different scenarios. In certain examples, owner 102 may utilize priority revocation to revoke certificate 140. In an example, priority revocation refers to a process where the revocation may include additional information over information identifying certificate 140 as the certificate to revoke. This additional information may be whether a high priority flag is set, a numerical level for the revocation, or the like. In these examples, the priority revocation may allow the implementation to put different data with the revocation, which may be used by subsequent rules to make more informed decisions with respect to the revocation of certificate 140.

In an example, when a priority flag is set in a revocation, the revocation of certificate 140 may be identified as a priority revocation. In this example, security policy 170 may specify that only priority revocations, such as those revocations with the priority flag set, should be immediately invalidated. This security policy 170 may enable owner 102 to cancel all jobs for declarative request 150 when user 104 loses permissions based on severe actions but leaving jobs for declarative request when the user loses permission based on less severe actions, such as user 104 retiring from a company.

In certain examples, the priority revocation may include different revocation levels, such as three levels, four levels, five levels, six levels, or the like, from a lowest priority to a highest priority. In an example, the revocation levels may be utilized to identify different reason or level for certificate 140 to be revoked. For example, if owner 102 is a company and user 104 is an employee in the company the revocation levels may refer to reason why the user is no longer at the company. In an example, a first or lowest priority level may identify that user 104 has transferred to a different area of the company, a second priority level may identify that the user has retired, a third priority level may identify that the user quit, a fourth priority level may identify that the user was fired, and a fifth priority level may identify that the user was a corporate spy. Based on the different priority levels, an administer may make rules in policy 170 as to how processor 120 may handle the different priority or security risks associated with priority revocation levels for certificate 140. For example, policy 170 may indicate that no action is performed when the priority level is the lowest priority. Policy 170 may also indicate that the jobs associated with declarative request 150 be immediately stopped if the priority level of the revocation is the highest priority. In certain examples, policy 170 may further indicate that each of the intermediate priority levels have a different one of a group of actions including, but not limited to, create an event for the revocation and provide a notification to a user of endpoint 108. Based on the priority level and policy 170, processor 120 may perform one of the indicated actions.

As described above, security within endpoint node 108 may be improved by controlling how processor 120 operates based on revocations of certificate 140 associated with declarative request 150. In an example, security within endpoint node 108 may be improved via policy-based rules by which work, jobs, or services for declarative request 150 may be invalidated under different circumstances. Another improvement may be that owner 102 or other authorities above user 104 may establish and enforce policies 170. In certain examples, a user associated with endpoint 108 may cause processor 120 to audit any lesser policy issues or violations rather than proactively invalidating certificate 140 under these issues.

Endpoint node 108 may be further improved by including a priority revocation levels to differentiate revocations which may be deemed more important or critical than other revocations. In certain examples, endpoint node 108 may also be improved via a flexible or policy-driven/specified re-assessment interval. In an example, processor 120 may implement a mechanism to automatically cancel or re-assess policies upon expirations of certificates, such as certificate 140. Processor 120 may further implement auditing of CRL 160 to trigger security revocations to be checked, and utilizing a certificate recheck interval to determine certificate validity.

Figure 2:
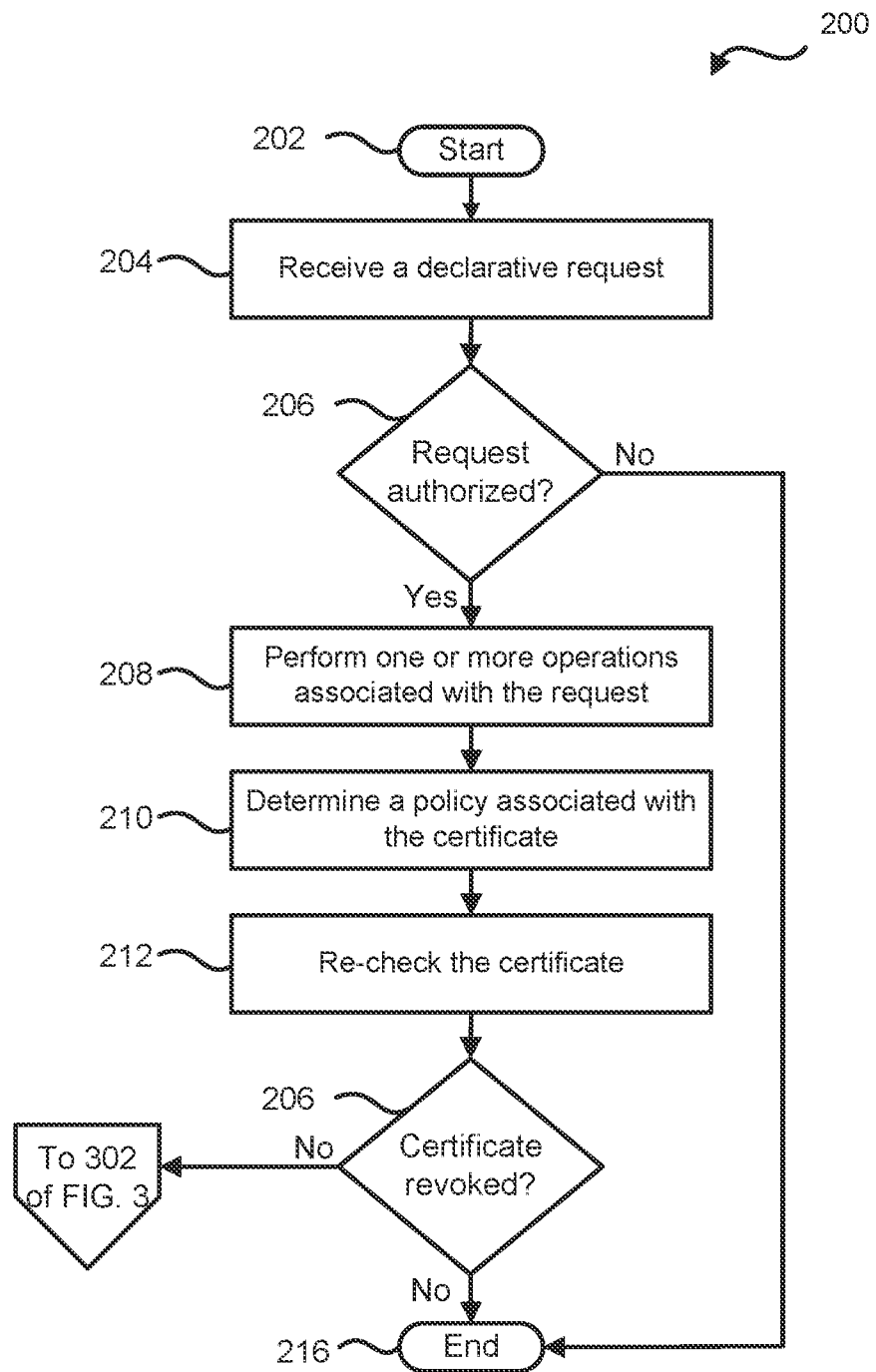
FIG. 2 is a flow diagram of a method for handling revocations of certificates associated with declarative requests according to at least one embodiment of the present disclosure.

FIG. 2 illustrates a flow of a method 200 for handling revocations of certificates associated with declarative requests according to at least one embodiment of the present disclosure, starting at block 202. It will be readily appreciated that not every method step set forth in this flow diagram is always necessary, and that certain steps of the methods may be combined, performed simultaneously, in a different order, or perhaps omitted, without varying from the scope of the disclosure.

At block 204, a declarative request is received by a processor of an endpoint node in a multiple node system. In an example, the declarative request may be received from a user node via a control plane of the multiple node system. The declarative request may include a job, workload, service, or the like to be continually executed within the endpoint node. The declarative request may also include a certificate authorizing the user to request that the job, workload, or service be performed in the endpoint node.

At block 206, a determination is made whether the declarative request is authorized. In an example, a processor of the endpoint may perform the authorization determination via any suitable operation or operations. For example, the processor may determine whether a signature in the certificate of the declarative request is valid. In certain examples, the signature may be valid based on processor utilizing a public owner key to verify that the signature was created from a corresponding private owner key. In an example, the public owner key may be stored in a memory of the endpoint node.

In response to the declarative request being authorized, one or more operations associated with the declarative request are performed in the endpoint node at block 208. At block 210, a policy associated with the certificate is determined. At block 212, the certificate for the declarative request is re-checked based on the policy. In an example, the certificate may be re-checked based on a trigger event. In certain examples, the policy may indicate that the trigger event for the certificate being re-checked may be any suitable event, such as at periodic intervals, response to a generated event, or the like.

At block 214, a determination is made whether the certificate has been revoked. In an example, a processor of the endpoint node may access a certificate revocation list (CRL) and determine whether the certificate is located within the CRL. If the certificate is in the CRL, the processor may determine that the certificate has been revoked. If the certificate has been revoked, the flow continues at block 302 of FIG. 3. If the certificate has not been revoked the flow ends at block 216.

Figure 3:
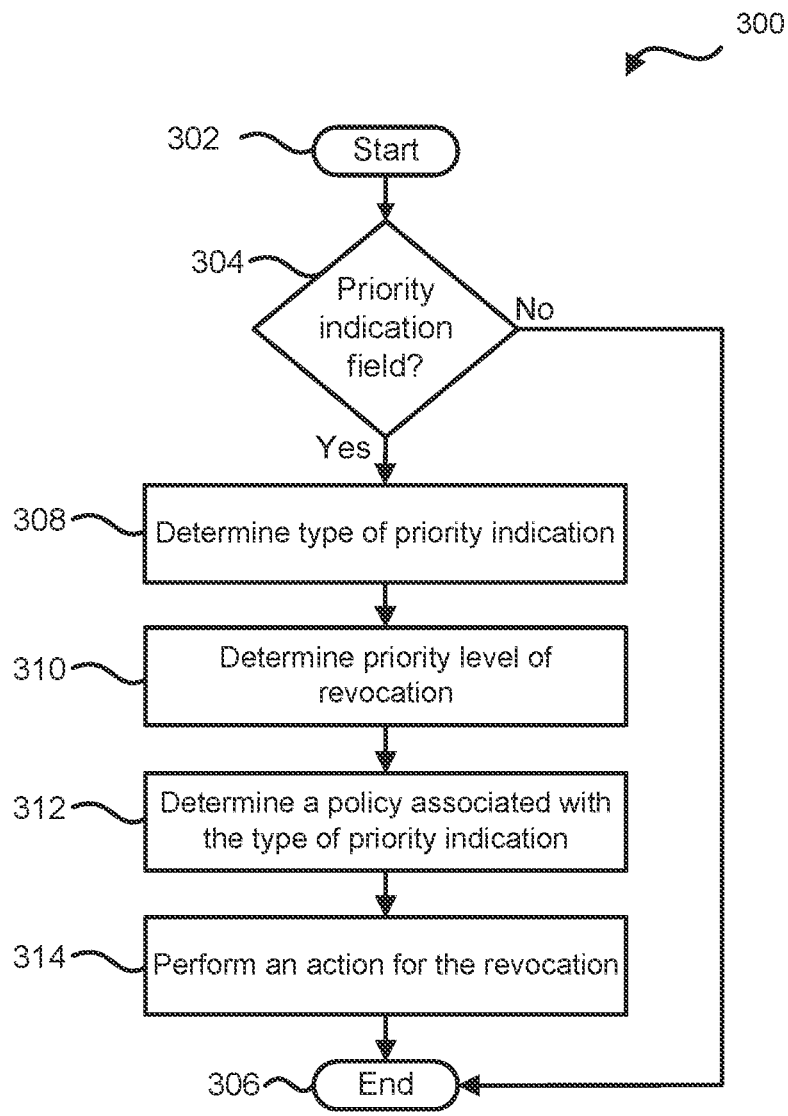
FIG. 3 is a flow diagram of a method for determining a revocation priority level for a certificate of a declarative request according to at least one embodiment of the present disclosure.

FIG. 3 illustrates a flow of a method 300 for determining a revocation priority level for a certificate of a declarative request according to at least one embodiment of the present disclosure, starting at block 302. It will be readily appreciated that not every method step set forth in this flow diagram is always necessary, and that certain steps of the methods may be combined, performed simultaneously, in a different order, or perhaps omitted, without varying from the scope of the disclosure.

At block 304, a determination is made whether a revocation priority indication field is included within the revocation of the certificate for the declarative request. If a revocation priority indication field is not set the flow ends at block 306. If a revocation priority indication field is located within the revocation, a type of revocation indication is determined at block 308. In an example, the type revocation priority indication may be a priority flag, a priority level indicator, or the like.

At block 310, a priority level is determined for the revocation. In an example, if the priority indication is a priority flag, the priority level may be high if the flag is in a first state, such as a high or low state, and the priority level may be low if the flag is in a second state, such as a low or high state. If the priority indication is a priority level, the priority level may be one of multiple priority levels. In an example, the priority levels may increase from a low priority, to a next higher priority, to any suitable number of additional next higher priorities, and to a highest priority.

At block 312, a policy associated with the type of revocation priority indication. At block 314, an action for the revocation of the certificate is performed and the flow ends at block 306. In an example, the action for the revocation may be based on the policy and the priority level in the priority indication field. For example, if the security policy specifies that only priority revocations, such as those revocations with the priority flag set, should be immediately invalidated, all jobs are canceled that are associated with a declarative request having this revoke certificate. If the revocation type is different priority levels, the policy may indicate that no action is performed when the priority level is the lowest priority. The policy may also indicate that the jobs associated with declarative request be immediately stopped if the priority level of the revocation is the highest priority. In certain examples, the policy may further indicate that each of the intermediate priority levels have a different one of a group of actions including, but not limited to, create an event for the revocation and provide a notification to a user of endpoint. Based on the priority level and the policy, a processor may perform one of the indicated actions.

Figure 4:
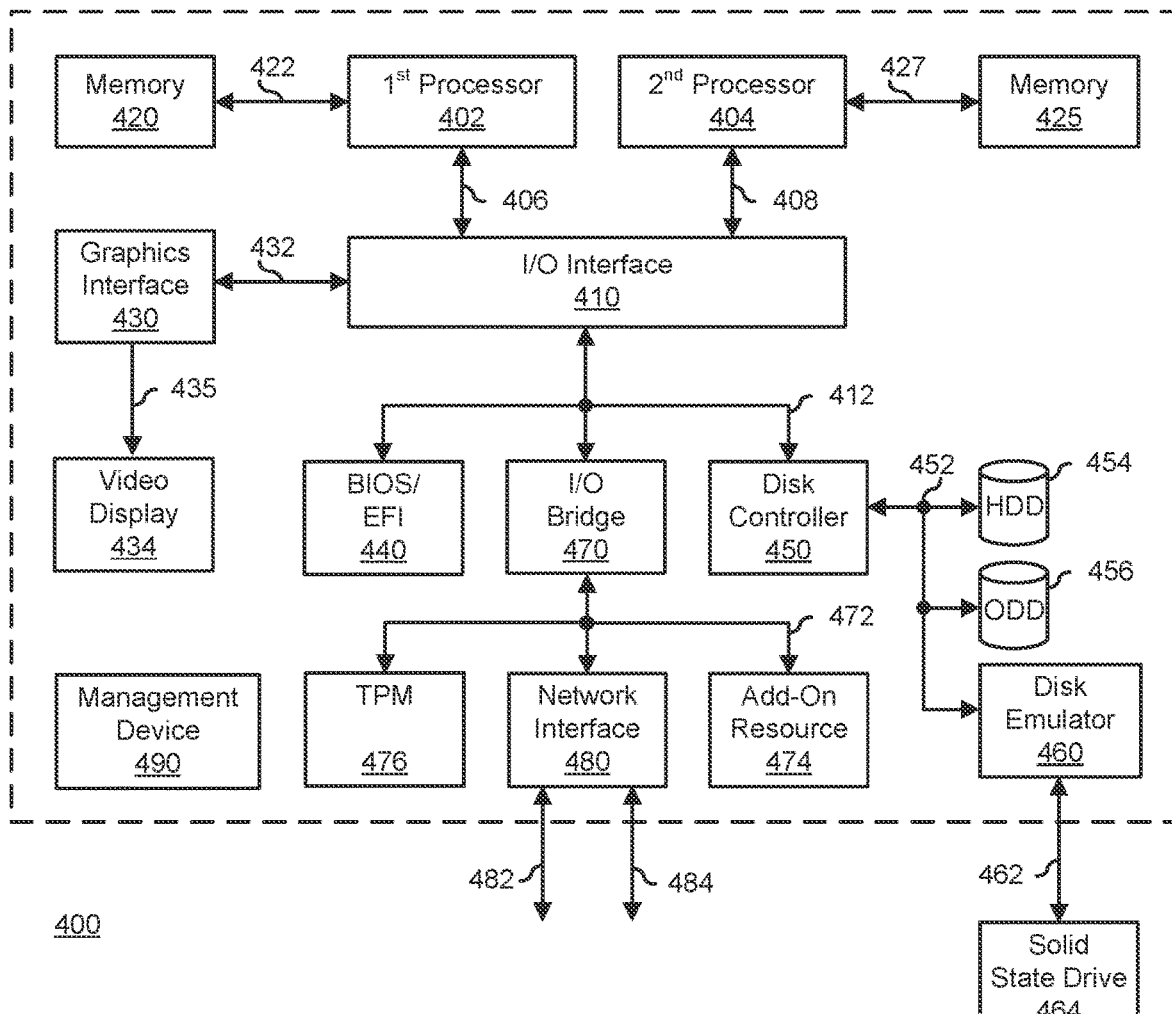
FIG. 4 is a block diagram of a general information handling system according to an embodiment of the present disclosure.

FIG. 4 shows a generalized embodiment of an information handling system 400 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described below and operates to perform one or more of the methods described below. Information handling system 400 includes a processors 402 and 404, an input/output (I/O) interface 410, memories 420 and 425, a graphics interface 430, a basic input and output system/universal extensible firmware interface (BIOS/UEFI) module 440, a disk controller 450, a hard disk drive (HDD) 454, an optical disk drive (ODD) 456, a disk emulator 460 connected to an external solid state drive (SSD) 462, an I/O bridge 470, one or more add-on resources 474, a trusted platform module (TPM) 476, a network interface 480, a management device 490, and a power supply 495. Processors 402 and 404, I/O interface 410, memory 420, graphics interface 430, BIOS/UEFI module 440, disk controller 450, HDD 454, ODD 456, disk emulator 460, SSD 462, I/O bridge 470, add-on resources 474, TPM 476, and network interface 480 operate together to provide a host environment of information handling system 400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 400.

In the host environment, processor 402 is connected to I/O interface 410 via processor interface 406, and processor 404 is connected to the I/O interface via processor interface 408. Memory 420 is connected to processor 402 via a memory interface 422. Memory 425 is connected to processor 404 via a memory interface 427. Graphics interface 430 is connected to I/O interface 410 via a graphics interface 432 and provides a video display output 436 to a video display 434. In a particular embodiment, information handling system 400 includes separate memories that are dedicated to each of processors 402 and 404 via separate memory interfaces. An example of memories 420 and 430 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 440, disk controller 450, and I/O bridge 470 are connected to I/O interface 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 410 can also include one or more other I/O interfaces, including an Industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof. BIOS/UEFI module 440 includes BIOS/UEFI code operable to detect resources within information handling system 400, to provide drivers for the resources, initialize the resources, and access the resources. BIOS/UEFI module 440 includes code that operates to detect resources within information handling system 400, to provide drivers for the resources, to initialize the resources, and to access the resources.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an IEEE 4394 (Firewire) interface, a proprietary interface, or a combination thereof. Alternatively, solid-state drive 464 can be disposed within information handling system 400.

I/O bridge 470 includes a peripheral interface 472 that connects the I/O bridge to add-on resource 474, to TPM 476, and to network interface 480. Peripheral interface 472 can be the same type of interface as I/O channel 412 or can be a different type of interface. As such, I/O bridge 470 extends the capacity of I/O channel 412 when peripheral interface 472 and the I/O channel are of the same type, and the I/O bridge translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as I/O interface 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 400. In particular, management device 490 is connected to various components of the host environment via various internal communication interfaces, such as a Low Pin Count (LPC) interface, an Inter-Integrated-Circuit (I$^2$C) interface, a PCIe interface, or the like, to provide an out-of-band (OOB) mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform other task for managing and controlling the operation of information handling system 400.

Management device 490 can operate off of a separate power plane from the components of the host environment so that the management device receives power to manage information handling system 400 when the information handling system is otherwise shut down. An example of management device 490 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 490 may further include associated memory devices, logic devices, security devices, or the like, as needed or desired.

Figure 5:
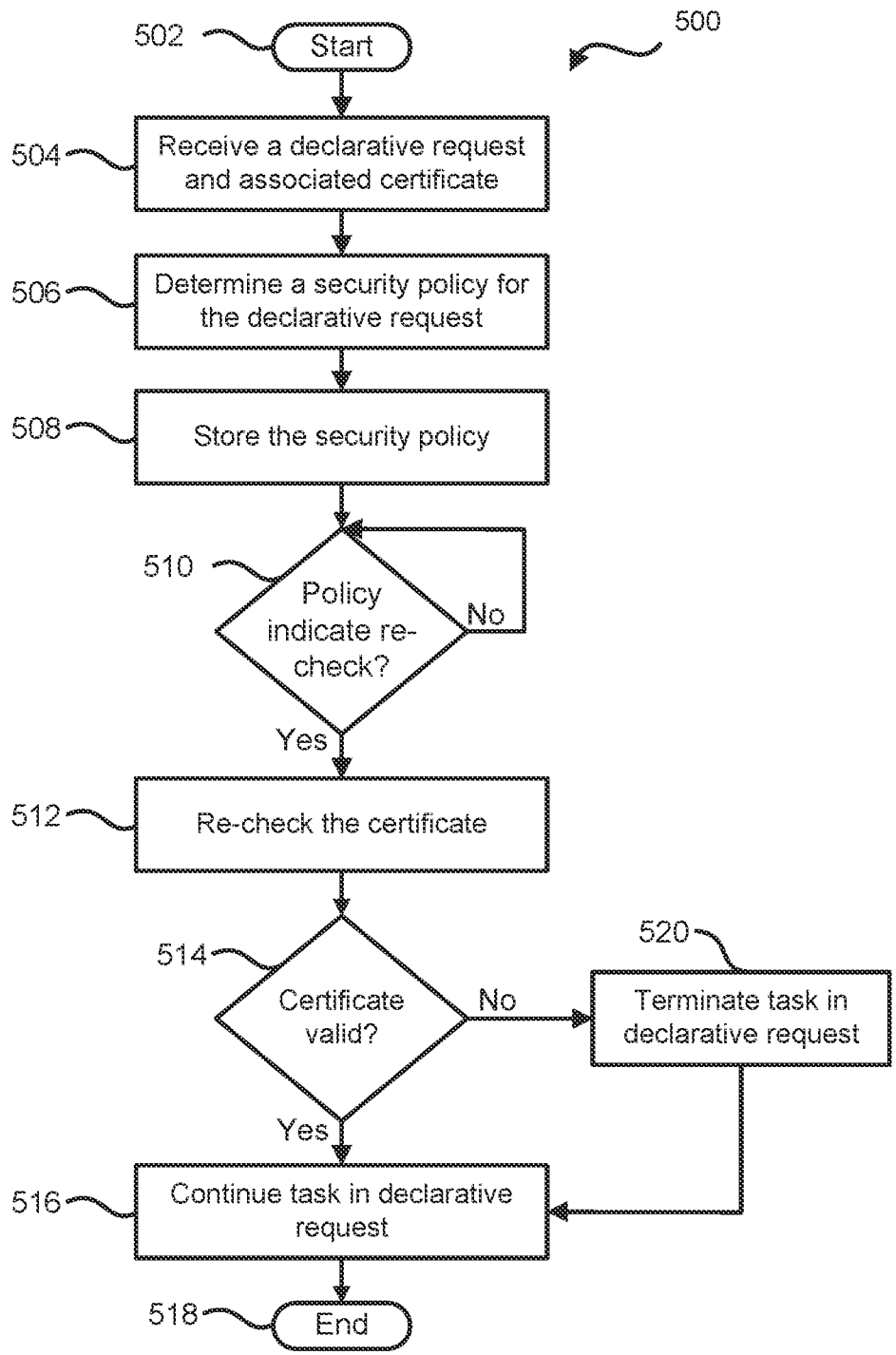
FIG. 5 is a flow diagram of a method for defining security policies for certificates associated with declarative requests according to at least one embodiment of the present disclosure.

FIG. 5 illustrates a flow of a method 500 for defining security policies for certificates associated with declarative requests according to at least one embodiment of the present disclosure, starting at block 502. It will be readily appreciated that not every method step set forth in this flow diagram is always necessary, and that certain steps of the methods may be combined, performed simultaneously, in a different order, or perhaps omitted, without varying from the scope of the disclosure.

At block 504, a declarative request is received by a processor of an endpoint node in a multiple node system. In an example, the declarative request may be received from a user node via a control plane of the multiple node system. The declarative request may include a job, task, workload, service, or the like to be continually executed within the endpoint node. The declarative request may also include a certificate authorizing the user to request that the job, task, workload, or service be performed in the endpoint node.

At block 506, a security policy for the declarative request is determined. In an example, the declarative request or workload may specify the security policy for the request of the work or task being done. For example, the security policy may be indicated in any suitable manner including, but not limited to, a single field of values to specify what to do, and a set of individual flags defining what to do in various instances. In certain examples, if the security policy is identified based on one or more values in a field of the declarative request, different values may correspond to different policies. The different values may be numerical values such that one numerical value corresponds to a policy and a different numerical value may correspond to another security policy. In certain examples, a processor may retrieve the value from the field of the declarative request and may utilize the retrieved value in any suitable manner to determine a corresponding security policy. In an example, processor may compare the retrieved value to data in a policy table. Based on the comparison, processor may determine the security policy associated with the retrieved value in policy table.

In an example, the field may include multiple flag bits. In certain examples, different combinations of flag bits being set may identify different security policies. A processor may retrieve the security policy by identifying a combination of flag bits set within a field of the declarative request. The combination of flag bits set may be utilized in any suitable manner to determine a corresponding security policy. In an example, processor may compare the combination of flag bits set to data in a policy table. Based on the comparison, processor may determine the security policy associated with the combination of flag bits set in policy table. In certain examples, the security policies may include, but not limited to, a policy to validate certificate only during initial ingestion of the declarative request, a policy that only priority revocations may invalidate a declarative task, a policy that an expiration of the certificate may invalidate the task, and a policy that any invalidation, revocation or expiration may invalidate the task.

At block 508, the security policy is stored in a storage of the endpoint node. In an example, a processor of an endpoint, such as endpoint 108 of FIG. 1, may store the security policy in a storage, such as storage 122 of FIG. 1, for use by processor. At block 510, a determination is made whether the security policy dictates or identifies that a re-check of the validity of the certificate should be performed. The security policy may identify a trigger event that initiates a re-check of the validity of the certificate. In an example, the trigger event may be initial ingestion of the declarative request. In this example, the certificate may be checked only when the declarative request is first received. If the certificate is valid at this point, the task associated with the declarative request may continue in the endpoint node even if the certificate becomes invalid at a later time.

In an example, the trigger event may be a priority revocation of the certificate associated with the declarative request. In this situation, a processor may terminate the task in the declarative request based on a priority revocation of the certificate. In another example, the trigger event may be an expiration of the certificate. In this situation, the processor may identify when the certificate has expired and terminate the task based on the expiration of the certificate. In an example, the trigger event may be any revocation or expiration of the certificate. Based on detection of a revocation or expiration, the processor may terminate the task. In certain examples, other trigger events may be defined by the security policy without varying from the scope of this disclosure. These trigger event may cause a processor to re-check the certificate associated with the declarative request and task.

In response to the security policy dictating a re-check, the validity of the certificate for the declarative request is re-checked at block 512. In an example, the re-check may be based on the detection of a trigger event. At block 514, a determination is made whether the certificate is valid. If the certificate is valid, the job, task, workload, service, or the like for the declarative request is continued at block 516 and the flow ends at block 518. If the certificate is not valid, the job, task, workload, service, or the like for the declarative request is terminated at block 520 and the flow ends at block 518.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An endpoint node of a multiple node environment, the endpoint node comprising:
  a storage memory configured to store a security policy for a declarative request received at the endpoint node; and
  a hardware processor to communicate with the storage memory, the hardware processor to:
    receive the declarative request, wherein the declarative request includes a certificate and a task to be performed in the endpoint node;
    determine the security policy for the declarative request, wherein the security policy is located within a field of the declarative request, wherein the field includes one of a plurality of values, and a different one of the values corresponds to a different one of a plurality of security policies;

based on the security policy, re-check the certificate to determine whether the certificate is still valid; and in response to the certificate being invalid, execute an action associated with the task being performed in the endpoint.

2. The endpoint node of claim 1, wherein in response to the certificate being valid, the hardware processor further to: continue the performance of the task in the endpoint node.

3. The endpoint node of claim 1, wherein prior to the re-check of the certificate, the hardware processor further to: determine whether the security policy indicates that a re-check of the certificate is to be performed.

4. The endpoint node of claim 1, wherein the executed action is to terminate the task.

5. The endpoint node of claim 1, wherein the security policy identifies a trigger event for when a validity of the certificate is checked and re-checked.

6. The endpoint node of claim 5, wherein the trigger event is an expiration of a maximum check interval for the certificate.

7. A method comprising:

receiving, by a processor of an endpoint node, a declarative request, wherein the declarative request includes a certificate and a task to be performed in the endpoint node;

determining a security policy for the declarative request, wherein the security policy identifies a trigger event for when a validity of the certificate is checked and re-checked, wherein the trigger event is an expiration of a maximum check interval for the certificate;

storing the security policy for the declarative request in a storage of the endpoint node;

based on the security policy, re-checking the certificate to determine whether the certificate is still valid; and in response to the certificate being invalid, executing, by the processor, an action associated with the task being performed in the endpoint.

8. The method of claim 7, wherein in response to the certificate being valid, the method further comprises: continuing the performance of the task in the endpoint node.

9. The method of claim 7, wherein prior to the re-checking of the certificate, the method further comprises: determining whether the security policy indicates that a re-check of the certificate is to be performed.

10. The method of claim 9, wherein the security policy is located within a field of the declarative request.

11. The method of claim 10, wherein the field includes one of a plurality of values, and a different one of the values corresponds to a different one of a plurality of security policies.

12. The method of claim 7, wherein the executed action is to terminate the task.

13. A method comprising:

receiving, by a processor of an endpoint node, a declarative request, wherein the declarative request includes a certificate and a task to be performed in the endpoint node;

determining a security policy for the declarative request, wherein the security policy is located within a field of the declarative request, wherein the field includes one of a plurality of values, and a different one of the values corresponds to a different one of a plurality of security policies;

storing the security policy for the declarative request in a storage of the endpoint node;

determining whether the security policy indicates that a re-check of the certificate is to be performed;

based on the security policy, re-checking the certificate to determine whether the certificate is still valid;

in response to the certificate being invalid, terminating, by the processor, the task being performed in the endpoint; and in response to the certificate being valid, continuing the performance of the task in the endpoint node.

14. The method of claim 13, wherein the security policy identifies a trigger event for when a validity of the certificate is checked and re-checked.

* * * * *